United States Patent
Klink et al.

(10) Patent No.: US 8,363,656 B2
(45) Date of Patent: Jan. 29, 2013

(54) MULTIPLE VIRTUAL MACHINES SHARING A SINGLE IP ADDRESS

(75) Inventors: Jeffrey Klink, Ajax (CA); Mikhail Shoykher, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 12/882,795

(22) Filed: Sep. 15, 2010

(65) Prior Publication Data

US 2012/0063458 A1 Mar. 15, 2012

(51) Int. Cl.
*H04L 12/28* (2006.01)
*H04L 12/56* (2006.01)

(52) U.S. Cl. .................................................. 370/392

(58) Field of Classification Search .................. 370/392
See application file for complete search history.

(56) References Cited

U.S. PATENT DOCUMENTS

| | | | |
|---|---|---|---|
| 6,665,295 B1 * | 12/2003 | Burns et al. | 370/389 |
| 7,228,337 B1 | 6/2007 | Bornstein et al. | |
| 7,444,408 B2 * | 10/2008 | Rajavelu et al. | 709/227 |
| 7,706,303 B2 | 4/2010 | Bose et al. | |
| 7,830,882 B2 * | 11/2010 | Johnson | 370/392 |
| 7,908,353 B2 * | 3/2011 | Hepburn | 709/223 |
| 2009/0259740 A1 | 10/2009 | Hepburn | |

OTHER PUBLICATIONS

VMWARE, "Workstation 5 Powerful Virtual Machine Software for the Technical Professional", VMWare User's Manual, Sep. 16, 2005, pp. 1-466 http://www.vmware.com/pdf/ws5_manual.pdf.
International Search Report and Written Opinion of the ISA dated Sep. 14, 2011—International Application No. PCT/EP2011/065945.

* cited by examiner

*Primary Examiner* — Ayaz Sheikh
*Assistant Examiner* — Blanche Wong
(74) *Attorney, Agent, or Firm* — Martin & Associates, LLC

(57) ABSTRACT

A method and apparatus allow multiple virtual machines to share the same IP address on an external network address space. The virtual machines reside on one or more physical host computer systems. A virtual network manager handles network traffic from a physical interface on the host computer and forwards network data to the appropriate virtual machine based on a destination port number. Data packets on the external network each have a destination and source port number. The virtual network manager uses a port range table that associates each virtual machine with a range of destination port numbers for incoming data packets. Each of the virtual machines is assigned a unique destination port range in the port range table and incoming data traffic on the external network is routed to the receiving virtual machines based on the destination port number in the data packet.

18 Claims, 5 Drawing Sheets

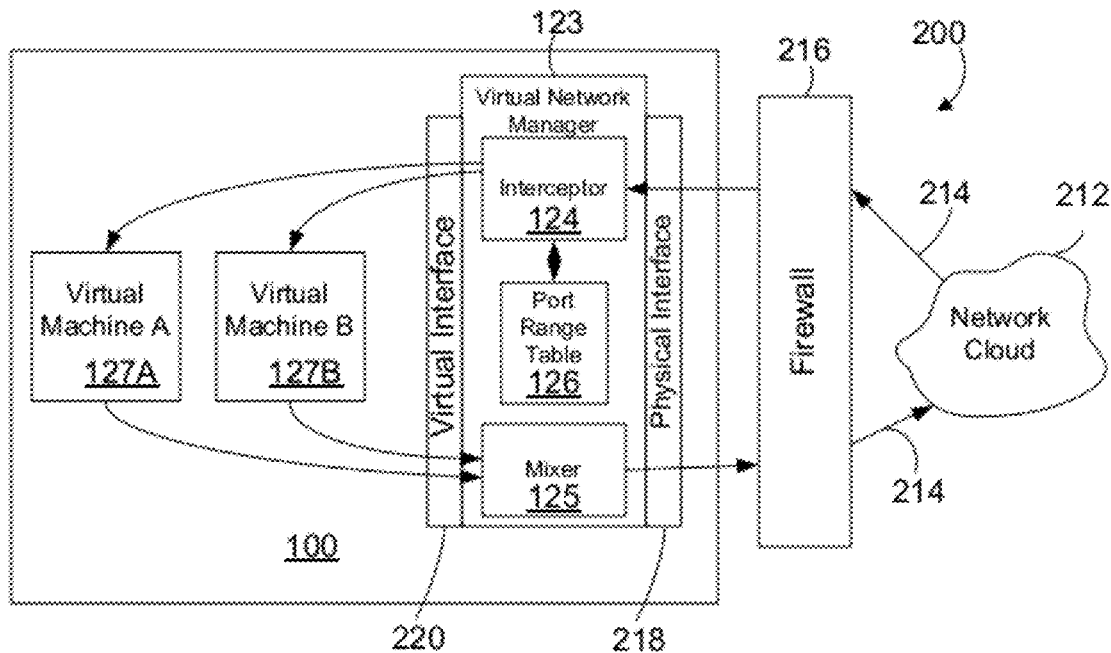
FIG. 2
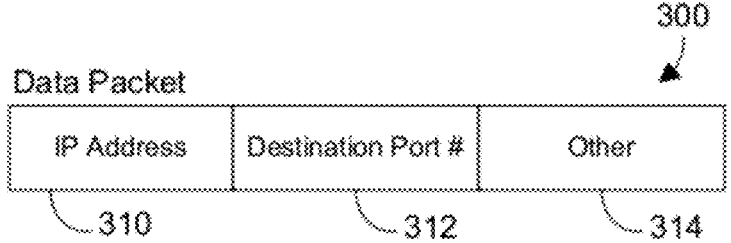
FIG. 3
FIG. 4

MULTIPLE VIRTUAL MACHINES SHARING A SINGLE IP ADDRESS

BACKGROUND

1. Technical Field

This disclosure generally relates to computer systems, and more specifically relates to sharing a single IP address among multiple virtual machines residing on one or more physical host computers.

2. Background Art

A single host computer may hold multiple virtual instances of a computer referred to as a virtual machine. A virtual machine is sometimes defined as an efficient and isolated duplicate of a real machine. A virtual machine is thus a duplicate or instance of a virtual computer residing on a physical host computer. A virtual machine is sometimes also called a logical partition. A principle advantage of a virtual machine system is that multiple operating system (OS) environments can co-exist on the same computer in isolation from each other. In addition, a virtual machine can provide an instruction set architecture that is different from that of the real machine. A virtual machine can be utilized to improve application provisioning, maintenance, high availability and disaster recovery.

Virtual machines residing on a physical host computer typically must share a physical network interface of the host computer. The physical network interface of the host computer is connected to an external network. As used herein, an external network is any network residing outside of a single physical machine and may/may not be indirectly contacted through a series of firewalls. In some cases, it is advantageous to have a single IP address from the external network address space assigned to the physical interface of the host computer. Virtual machines residing on the host have their own virtual network interfaces connected to the same external network via the host physical interface. In the prior art, there have been various approaches to having multiple virtual machines use the same physical network interface.

BRIEF SUMMARY

The disclosure and claims herein are directed to multiple virtual machines (virtual computers) that collectively are assigned the same IP address on an external network address space. The virtual machines reside on one or more physical host computer systems. A virtual network manager handles network traffic from a physical interface on the host computer and forwards network data to the appropriate virtual machine based on a destination port number. Data packets on the external network each have a destination and source port number. The virtual network manager uses a port range table that associates each virtual machine with a range of destination port numbers for incoming data packets. Each of the virtual machines is assigned a unique destination port range in the port range table and incoming data traffic on the external network is routed to the receiving virtual machines based on the destination port number in the data packet.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a block diagram that illustrates how data packets are routed to multiple virtual machines residing on a host computer by a virtual network manager;

FIG. 3 is a block diagram that represents a data packet sent over the network described herein;

FIG. 4 is a block diagram that shows an example of a port range table;

DETAILED DESCRIPTION

Described herein is an apparatus and method for multiple virtual machines to share the same IP address on an external network address space. The virtual machines reside on one or more physical host computer systems. A virtual network manager handles network traffic from a physical interface on the host computer and forwards network data to the appropriate virtual machine based on a destination port number. Data packets on the external network each have a destination and source port number. The virtual network manager uses a port range table that associates each virtual machine with a range of destination port numbers for incoming data packets. Each of the virtual machines is assigned a unique destination port range in the port range table and incoming data traffic on the external network is routed to the receiving virtual machines based on the destination port number in the data packet.

Figure 1:
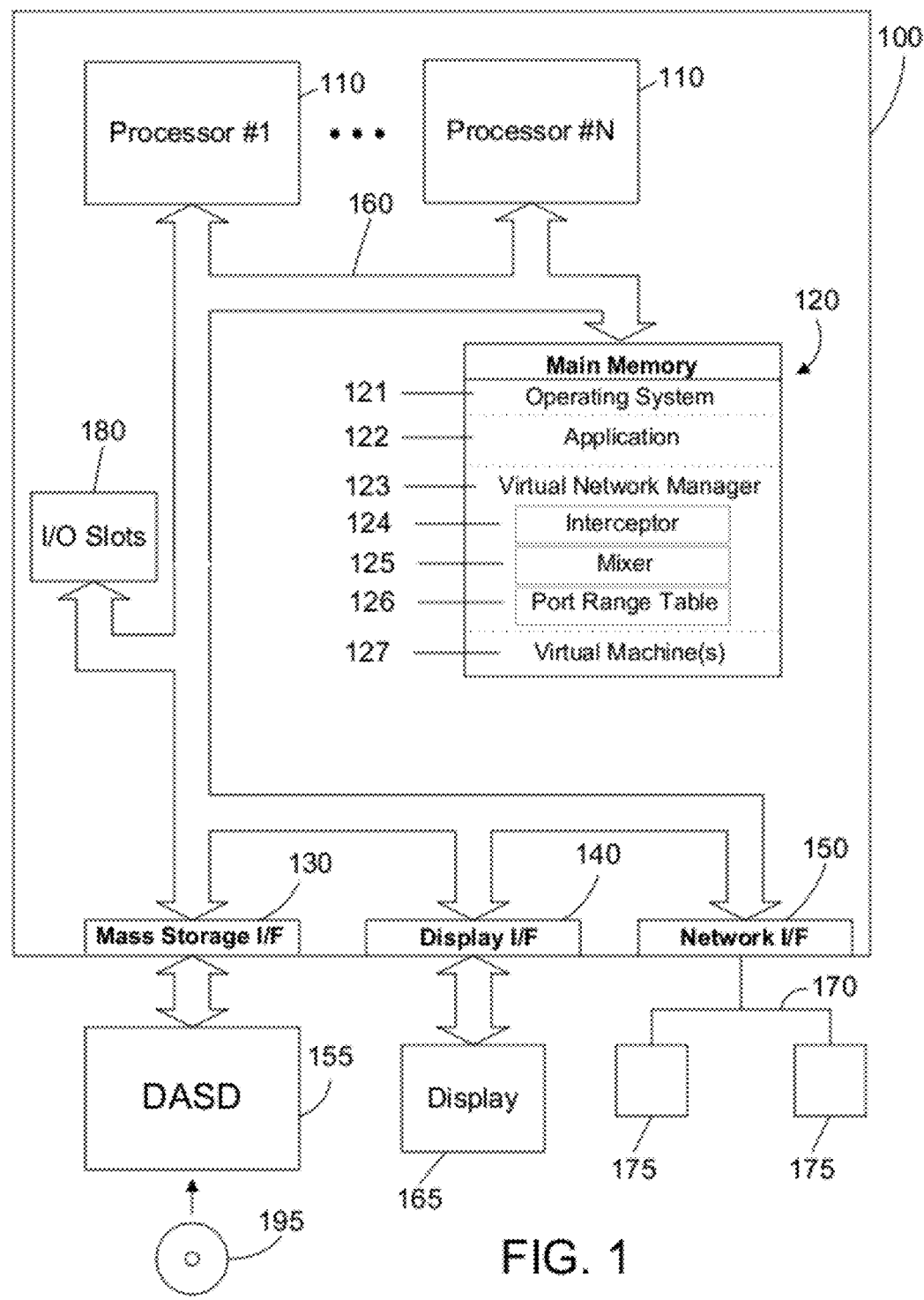
FIG. 1 is a block diagram of a computer system with a virtual network manager utilizing a port range table to enable multiple virtual computers to use a single network IP address as described herein.

Referring to FIG. 1, a computer system 100 is one suitable implementation of a computer system that includes a virtual network manager as described herein. Computer system 100 is an International Business Machines Corporation (IBM®) Power System which can run multiple operating systems including the IBM® i operating system and Linux operating system. However, those skilled in the art will appreciate that the disclosure herein applies equally to any computer system capable of being connected to an external network. As shown in FIG. 1, computer system 100 comprises one or more processors 110, a main memory 120, a mass storage interface 130, a display interface 140, and a network interface 150, and a plurality of I/O slots 180. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195. Note that mass storage interface 130, display interface 140, and network interface 150 may actually be implemented in adapters coupled to I/O slots 180. An I/O adapter is one suitable network interface 150 that may be implemented in an external card that is plugged into one of the I/O slots 180. In addition, other I/O devices such as modems can be plugged into one of the I/O slots 180.

Main memory 120 preferably contains an operating system 121. Operating system 121 is preferably a multitasking operating system, such as AIX, or Linux; however, those skilled in the art will appreciate that the spirit and scope of this disclosure is not limited to any one operating system. Any suitable operating system can be used. Operating system 121 is a sophisticated program that contains low-level code to manage the resources of computer system 100. Some of these resources are processors 110, main memory 120, mass storage interface 130, display interface 140, network interface 150, system bus 160, and I/O slots 180. Each virtual machine may also have an operating system. The operating system in each virtual machine or partition may be the same as the operating system in virtual machines, or may be a completely different operating system. Thus, one virtual machine can run the AIX operating system, while a different virtual can run another instance of AIX, possibly a different release, or with different environment settings (e.g., time zone or language). In this manner the virtual machines can provide completely different computing environments on the same physical computer system. The memory further includes a software application 122. The memory includes a virtual network manager 123. The virtual network manager includes an interceptor 124, a mixer 125 and a port range table 126. The memory also includes one or more virtual machines or computers 127. Each of these entities in the memory is described further below.

The virtual machine(s) 127 are shown to reside within main memory 120. However, one skilled in the art will recognize that a virtual machine (or logical partition) is a logical construct that includes resources other than memory. A virtual machine 127 typically specifies a portion of memory, along with an assignment of processor capability an other system resources, such as I/O slots 180 and I/O adapters, which may reside in I/O slots 180. Thus, one virtual machine could be defined to include two processors and a portion of memory 120, along with one or more I/O processors that can provide the functions of mass storage interface 130, display interface 140, network interface 150, or interfaces to I/O adapters or other devices (such as modems) plugged into I/O slots 180. Another virtual machine could then be defined to include three other processors, a different portion of memory 120, and one or more I/O processors. The virtual machine(s) is shown in FIG. 1 to symbolically represent virtual machines or logical partitions, which would include system resources outside of memory 120 within computer system 100.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, application 122, virtual network manager 123 and the virtual machine(s) 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the application 122 and the virtual network manager 123.

Although computer system 100 is shown to contain only a single processor and a single system bus, those skilled in the art will appreciate that a virtual network manager may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP (Transmission Control Protocol) and User Datagram Protocol (UDP) are examples of suitable network protocols.

FIG. 2 illustrates a block diagram for a host computer with multiple virtual machines to share the same IP address on an external network address space. The host computer 100 in FIG. 2 is the host computer described above with reference to FIG. 1 or a similar computer system. The host computer 100 is connected to a network cloud 212 by a physical network 214. The network cloud represents an external network of computers connected together and communicating with the host computer 100. Data communications from other computers in the network cloud 212 flows to the host computer 100 through a Firewall 216. Data is sent to the host computer over the network 214 in data packets according to different data protocols. The data packets are routed to multiple virtual machines 127A, 127B residing on the host computer 100 by a virtual network manager 123. The virtual network manager 123 receives the data packets on a physical interface 216 and then sends the data packets to the appropriate virtual machine using a virtual interface 220. The virtual network manager has an interceptor 124 that manages incoming data and a mixer 125 that manages outgoing data. The mixer 125 receives outgoing packets from the virtual machines 127A, 127B and sends them to the external network 212. The interceptor 124 intercepts incoming traffic to the shared address and depending on the target port either sends it to the destination virtual machine via the via the virtual interface or returns it back to the host networking stack if the destination port does not match any of assigned port ranges. The interceptor uses a port range table 126 to determine where to send each data packet. The interceptor looks at the destination port number in the data packet and sends the data packet to the virtual machine assigned to receive data packets with that particular destination port number as determined by the port range table 126.

FIG. 3 is a block diagram that represents a highly simplified diagram of a data packet used for data communication on the external network. The data packed may be a TCP or UDP data packet as known in the art. The data packet 300 includes an IP address 310 and a destination port number 312. Other elements 314 of the data packet are not described here but are well known in the art.

FIG. 4 illustrates a table that represents one suitable implementation of a port range table 126 used by the interceptor 124 (FIG. 2) in the virtual network manager 123 (FIG. 2). The port range table 126 is preferably a file of records stored in memory, in a data storage device, or both. The port range table 126 includes a plurality of destination port ranges 410 and an associated virtual machine 412 for each port range. A port range 410 defines one or more destination port numbers that are used by the virtual network manager to route data to the corresponding virtual machine 412. In the illustrated example, a port range of 0-25 414 is associated with Virtual Machine 1 416, and a port range of 26-80 418 is associated with Virtual Machine 2 420. The port range table 126 may include any number of other port ranges as indicated by the "other" range 422 associated with the other virtual machine 424. The port range table 126 may be stored in any suitable format to show a logical condition between the port ranges and virtual machines as described herein. An entire port range may be closed on the host computer to disable packets for an entire virtual machine thus simplifying system administration when managing virtual machines on the host.

For TCP and UDP protocols, a single IP address has a limited number of destination ports and port numbers typically may not conflict between applications when using one IP address. One IP address may permit only one application on a virtual machine to be the receiver of communication to a certain port. For example, only one virtual machine can use the TCP port 21 for communication where only one IP address exists as described herein. By allowing the address space visible to the virtual machine to belong to the external network address space, the address space of the virtual machines is transparent to all protocols including peer to peer protocols and Voice over IP protocols.

Both the mixer 125 and interceptor 124 are located behind the host firewall 216 thus protecting virtual machines from external threats. Firewalls for the host system and client system may remain unchanged. Since the shared IP address is seen as 'local' to the host, it treats any packet rule as though it is a local rule and directing it for a local application. A secondary firewall or rule set is not required since only one IP address is used.

In the preferred example described above, all the virtual machines are configured to use the same IP address on the network interface. Each virtual machine is assigned a unique port range, which may consist of one or more non-contiguous ranges. All applications that are accepting incoming TCP or UDP packets are configured to use ports from the assigned range only as these will be the only known incoming/outgoing ports. The virtual machine operating systems may be configured to use ephemeral ports from the assigned range. Ephemeral ports are used as temporary ports in outgoing TCP and UDP packets. The virtual machines assign the source port on outgoing messages in the same range of ports assigned to the virtual machine in the port range table so that returning messages will return to the proper virtual machine. The host is configured to intercept packets sent to the shared IP address assigned to virtual machines and to forward into the destination machine based on the packet destination port number. All outgoing packets are typically transmitted to the external network unmodified. If the host is also using the shared IP address, a unique port range is assigned to the host. In this case the host is allocating permanent and ephemeral ports from this range. The packets received by the host for the shared address are intercepted by interceptor and directed to a virtual machine. If the host is using the shared IP, all packets that are not matched by the one of virtual machine port range are returned back to the host networking stack.

Figure 5:
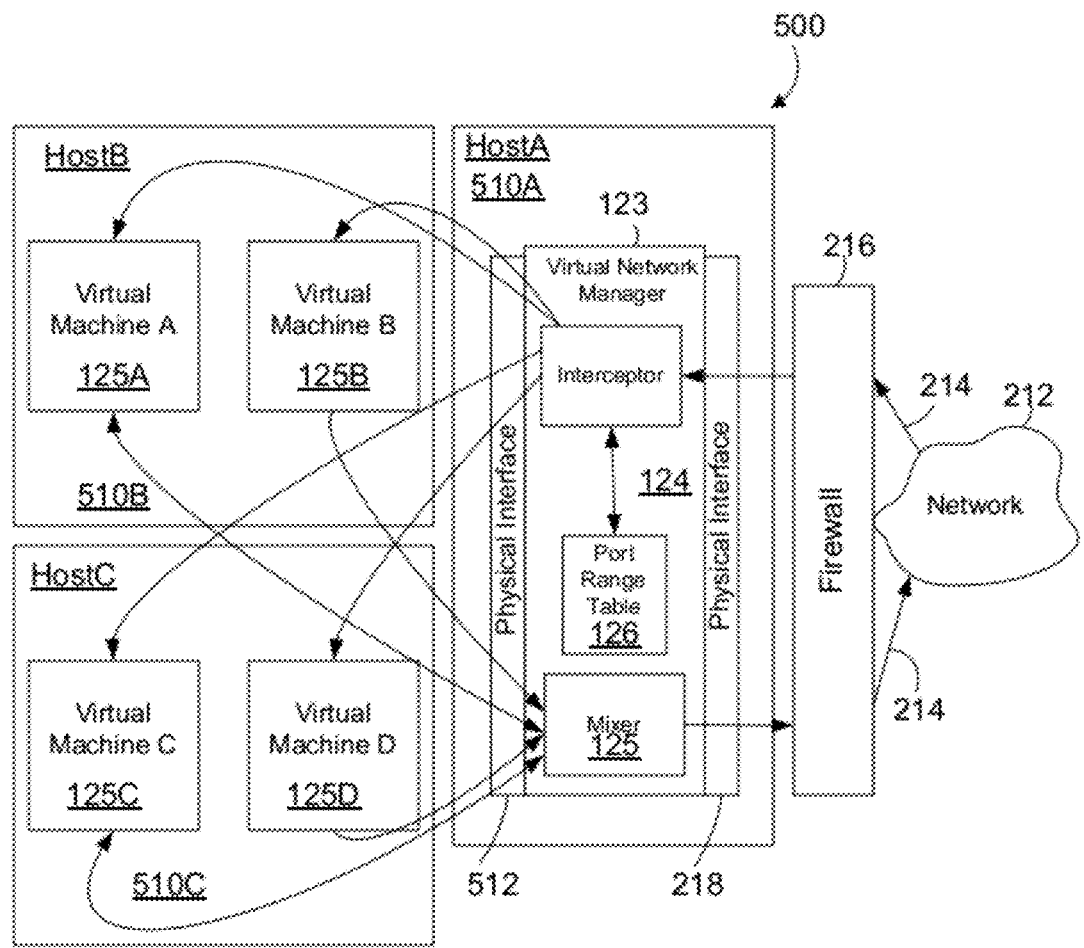
FIG. 5 is a block diagram similar to FIG. 1 that illustrates multiple physical hosts with virtual machines utilizing the same IP address.

FIG. 5 illustrates is a block diagram for a computer system with multiple virtual machines that share the same IP address on an external network address space. The computer system of FIG. 5 is similar to the system shown in FIG. 2 but shows an example of how the system can be scaled to multiple physical host computers. In FIG. 5, the host computer 510A has a virtual network manager 123 similar to the host computer 100 described in FIG. 2. In contrast to the system in FIG. 2, the virtual network manager 123 in FIG. 5 communicates with virtual machines that reside on one or more other hosts. In the example shown, the virtual network manager 123 sends data packets to Virtual Machine A 125A and virtual Machine B 125B on HostB 510B, and Virtual Machine C 125 C and virtual Machine D 125D on HostC 510C. In this case, the virtual network manager handles communication to the virtual machines on different physical host computers over a physical network 512 rather than a virtual network between the host computers 510A, 510B, 510C. The connection to the virtual machines on the other hosts computers can use any suitable physical network connection. This architecture allows a virtual machine to migrate to a different physical host without changing the IP address.

Figure 6:
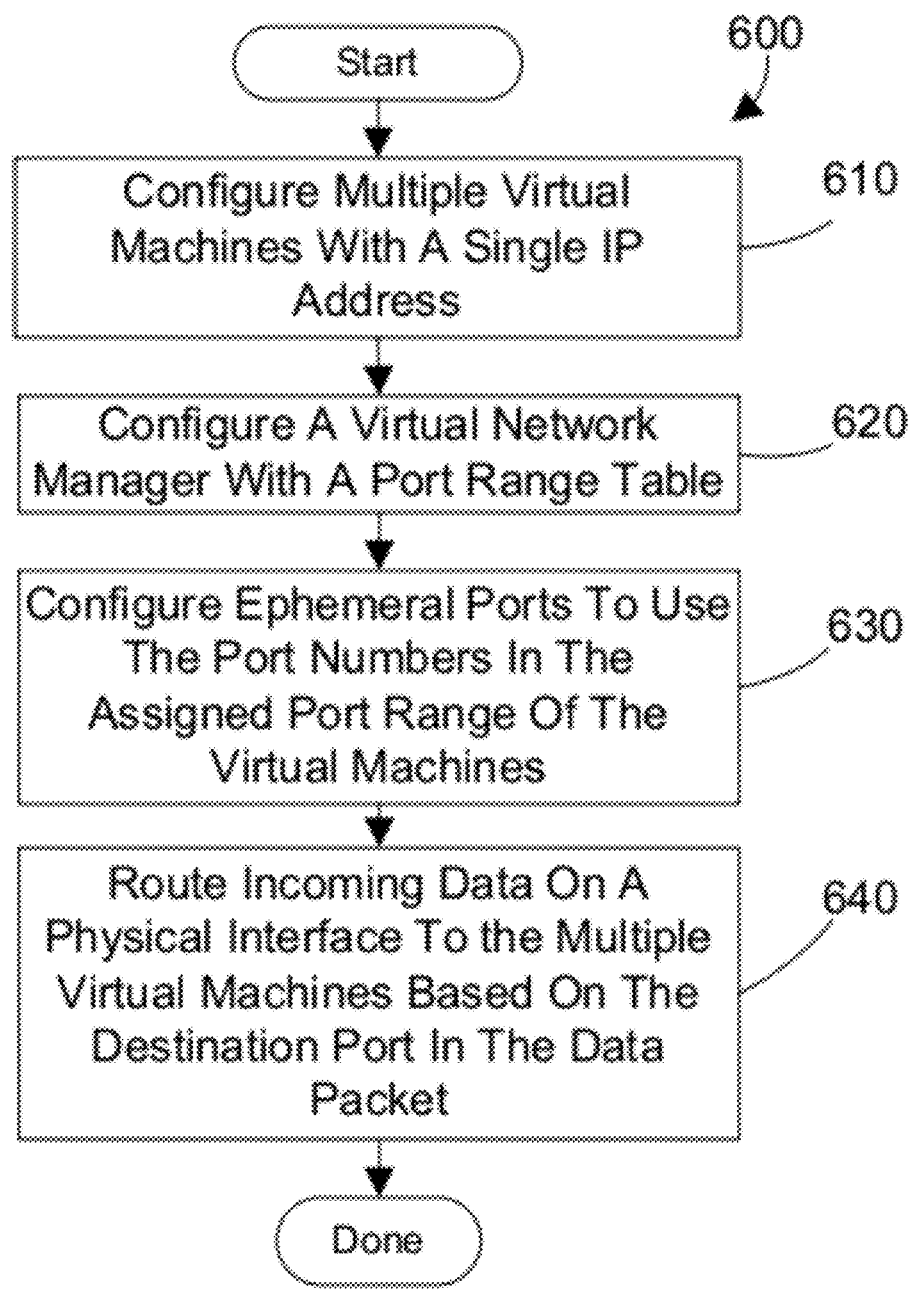
FIG. 6 is a method flow diagram for sharing a single IP address among multiple virtual machines.

FIG. 6 shows a method 600 for assigning the same IP address on an external network to multiple virtual computers as claimed herein. The steps in method 600 are preferably performed by the virtual network manager 123 (FIG. 1), but portions of the method may also be performed by other software associated with the computer system or by a system administrator. First, configure multiple virtual machines to use a single IP address (step 610). Next, configure a port range table with a range of ports for each virtual machine (step 620). Then, configure ephemeral ports of each of the virtual machines to use source port numbers in the assigned port range for the virtual machine in the port range table (step 630). Then route incoming data on a physical interface to the multiple virtual machines based on a destination port number in the data packet (step 640). The method is then done.

Figure 7:
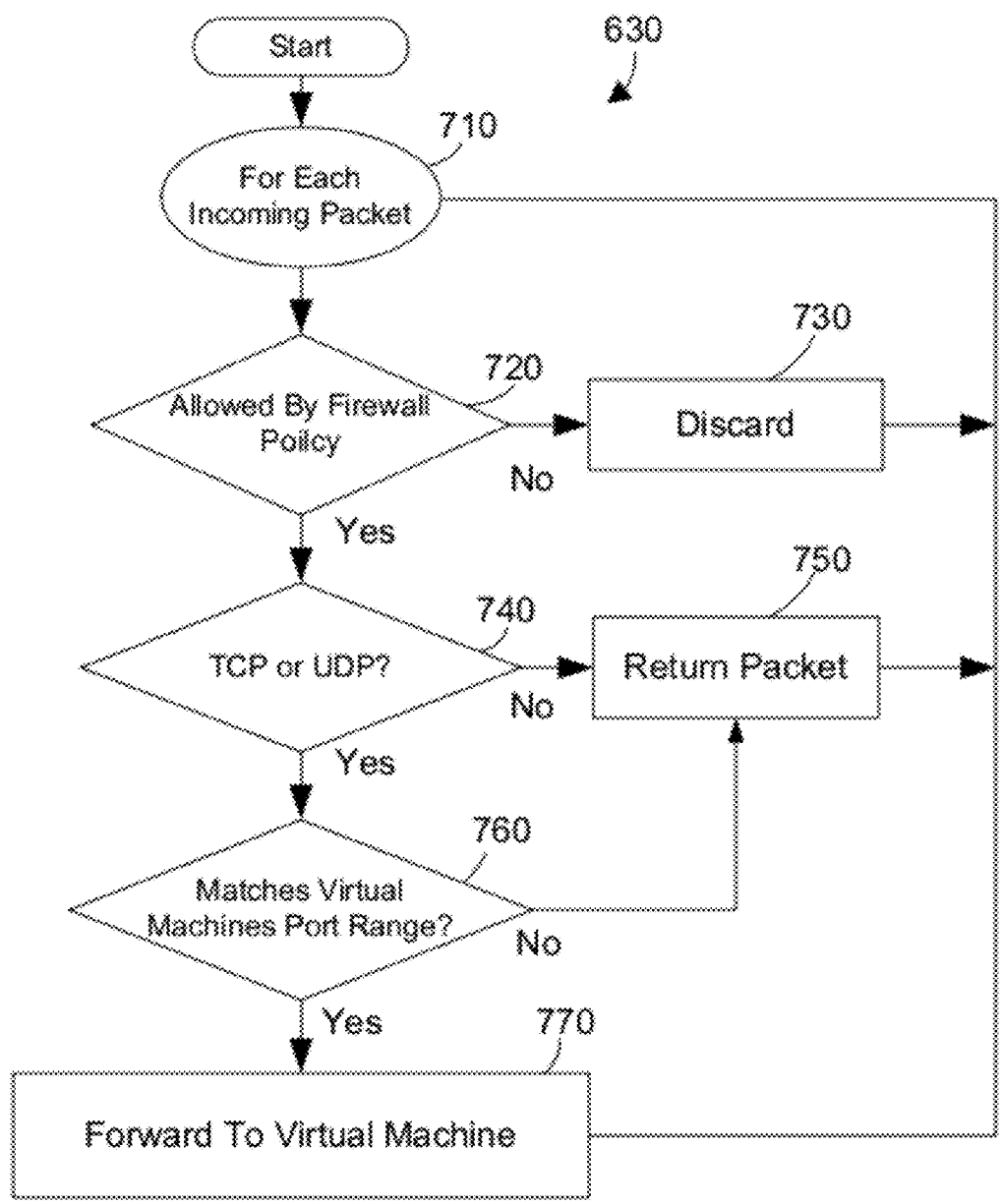
FIG. 7 is an example of a method flow diagram for routing incoming data to multiple virtual machines based on a port range table according to step 630 in FIG. 6.

FIG. 7 shows a method 630 for routing data on a physical interface to multiple virtual machines based on the port range table. Method 630 is an example of performing the step 630 in FIG. 6 according to the examples described in the previous paragraph. The steps in method 630 are preferably performed by the virtual network manager 123 (FIG. 1), but portions of the method may also be performed by other software associated with the computer system. Method 630 is performed for each new incoming data packet on the physical interface (step 710). Next, the data packed is checked by the firewall (step 720). If the data packet is not allowed by the firewall (step 720=no), then the data packed is discarded (step 730) and the method returns to step 710. If the data packet is allowed by the firewall (step 720=yes), then check if the data packed conforms to the TCP or UDP protocols (step 740). If the data packet does not conform to the TCP or UDP protocols (step 740=no) then return the packet (step 750) and return to step 710. If the data packet does conform to the TCP or UDP protocols (step 740=yes) then determine if the destination port number of the packet matches a destination port number in a port range for a virtual machine in the port range table (step 760). If the destination port number of the packet does not matches a destination port number in the port range table (step 760=no) then return the packet (step 750) and return to step 710. If the destination port number of the packet does matches a destination port number in the port range table (step 760=yes), then forward the data packet to a unique one of the virtual machines depending on the destination port number in the data packet (step 770) and return to step 710. In the embodiment described above, the virtual machine number of the unique virtual machine to forward the packet is determined by selecting the virtual machine number stored in the port range table corresponding to a port range that includes the destination port number in the data packet.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One skilled in the art will appreciate that many variations are possible within the scope of the claims. While the examples herein are described in terms of time, these other types of thresholds are expressly intended to be included within the scope of the claims. Thus, while the disclosure is particularly shown and described above, it will be understood by those skilled in the art that these and other changes in form and details may be made therein without departing from the spirit and scope of the claims.

The invention claimed is:
1. An apparatus comprising:
a host computer system with a processor and a memory;

a physical interface with a single internet protocol (IP) address connecting the host computer to an external network;

a plurality of virtual machines each with a virtual machine number in the memory;

a data packet with a destination port number received on the physical interface;

a virtual network manager that forwards the data packet to a unique one of the plurality of virtual machines depending on the destination port number in the data packet; and a port range table with a plurality of port ranges and a corresponding virtual machine number for each port range, and wherein the virtual network manager determines the virtual machine number of the unique one of the plurality of virtual machines by selecting the virtual machine number stored in the port range table corresponding to a port range that includes the destination port number in the data packet.

2. The apparatus of claim 1 further comprising a firewall protecting the host computer from the external network.

3. The apparatus of claim 1 wherein the plurality of virtual machines are located on a plurality of host computer systems.

4. The apparatus of claim 1 and wherein the virtual network manager forwards the data packet to the virtual machine on a virtual network.

5. The apparatus of claim 1 wherein the data packets conform to a protocol chosen from the following: TCP (Transmission Control Protocol) and User Datagram Protocol (UDP).

6. The apparatus of claim 1 wherein ephemeral ports of the virtual machines are configured to use port numbers in a range of port numbers in the port range table assigned to the virtual machine.

7. A computer-implemented method for sending data to a virtual machine on a host computer system, the method comprising the steps of:

(A) configuring multiple virtual machines with a single internet protocol (IP) address;

(B) configuring a virtual network manager with a port range table with a plurality of port ranges and a corresponding virtual machine number for each port range;

(C) configuring ephemeral ports of the virtual machines to use port numbers in a range of port numbers in the port range table assigned to the virtual machine; and (D) routing an incoming data packet from a physical interface to a unique one of the multiple virtual machines based on a destination port number in the data packet.

8. The method of claim 7 wherein the step of routing the incoming data packet further comprises:

determining a virtual machine number corresponding to the destination port number in the data packet, where the destination port number matches a port range in the port range table and routing the data packet to the unique one virtual machine with the determined virtual machine number.

9. The method of claim 7 further comprising the steps of:

(E) discarding the incoming packet where the incoming packet is not allowed by a firewall; and (F) returning the incoming packet if the packet does not conform to a protocol chosen from the following: TCP (Transmission Control Protocol) and User Datagram Protocol (UDP.

10. The method of claim 7 wherein the virtual network manager forwards the data packet to the virtual machine on a virtual network.

11. The method of claim 7 wherein the plurality of virtual machines are located on a plurality of host computers.

12. A computer-implemented method for sending data to a virtual machine on a host computer system, the method comprising the steps of:

(A) configuring multiple virtual machines located on at least one physical host computer with a single internet protocol (IP) address;

(B) configuring a virtual network manager with a port range table with a plurality of port ranges and a corresponding virtual machine number for each port range;

(C) routing an incoming data packet from a physical interface to a unique one of the multiple virtual machines based on a destination port number in the data packet by determining a virtual machine number corresponding to a port range in the port range table which includes the destination port number in the data packet and routing the data packet to the unique one virtual machine with the determined virtual machine number;

(D) discarding the incoming packet where the incoming packet is not allowed by a firewall;

(E) returning the incoming packet if the packet does not conform to a protocol chosen from the following: TCP (Transmission Control Protocol) and User Datagram Protocol (UDP);

(F) configuring ephemeral ports of the virtual machines to use port numbers in a range of port numbers in the port range table assigned to the virtual machine;

(G) wherein the data packet is routed on a virtual network.

13. An article of manufacture comprising software stored on non-transitory computer readable storage medium, the software comprising:

a virtual network manager that forwards a data packet with a destination port number received on a physical interface to a unique one of a plurality of virtual machines depending on the destination port number in the data packet, where the plurality of virtual machines share the physical interface having a single internet protocol (IP) address connecting a host computer to an external network, wherein the virtual network manager further comprises a port range table with a plurality of port ranges and a corresponding virtual machine number for each port range, and wherein the virtual network manager determines the virtual machine number of the unique one of the plurality of virtual machines by selecting the virtual machine number stored in the port range table corresponding to a port range that includes the destination port number in the data packet.

14. The article of manufacture of claim 13 wherein a firewall protects the host computer from the external network.

15. The article of manufacture of claim 13 and wherein the plurality of virtual machines are located on a plurality of host computers.

16. The article of manufacture of claim 13 wherein the virtual network manager forwards the data packet to the virtual machine on a virtual network 17. The article of manufacture of claim 13 wherein the data packets conform to a protocol chosen from the following: TCP (Transmission Control Protocol) and User Datagram Protocol (UDP).

18. The article of manufacture of claim 13 wherein ephemeral ports of the virtual machines are configured to use port numbers in a range of port numbers in the port range table assigned to the virtual machine.

* * * * *